United States Patent
Balko (10) Patent No.: US 9,135,595 B2
(45) Date of Patent: *Sep. 15, 2015

(54) HIGH-LOAD BUSINESS PROCESS SCALABILITY

(71) Applicant: Soeren Balko, Indooroopilly (AU)

(72) Inventor: Soeren Balko, Indooroopilly (AU)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/014,794

(22) Filed: Aug. 30, 2013

(65) Prior Publication Data

US 2013/0346140 A1      Dec. 26, 2013

Related U.S. Application Data

(63) Continuation of application No. 13/094,366, filed on Apr. 26, 2011, now Pat. No. 8,561,080.

(51) Int. Cl.
*G06F 3/00* (2006.01)
*G06Q 10/06* (2012.01)
*G06F 9/50* (2006.01)
*G06F 9/54* (2006.01)

(52) U.S. Cl.
CPC ........ *G06Q 10/06316* (2013.01); *G06F 9/5055* (2013.01); *G06F 9/546* (2013.01); *G06F 2209/509* (2013.01); *G06F 2209/5013* (2013.01)

(58) Field of Classification Search
CPC .................................. G06F 9/546; G06F 9/542
USPC ......................................................... 719/314
See application file for complete search history.

(56) References Cited

U.S. PATENT DOCUMENTS

| 5,884,046 | A | 3/1999 | Antonov | |
|---|---|---|---|---|
| 6,996,615 | B1 * | 2/2006 | McGuire | 709/226 |
| 7,092,940 | B1 | 8/2006 | Ethen et al. | |
| 7,814,500 | B2 * | 10/2010 | Weber | 719/314 |
| 7,839,848 | B2 * | 11/2010 | Cai | 370/389 |
| 8,103,779 | B2 * | 1/2012 | Belkin et al. | 709/227 |
| 8,295,305 | B2 * | 10/2012 | Basso et al. | 370/468 |
| 2003/0037147 | A1 * | 2/2003 | Matsubayashi et al. | 709/227 |
| 2003/0041178 | A1 | 2/2003 | Brouk et al. | |

(Continued)

FOREIGN PATENT DOCUMENTS

| EP | 1939743 | 7/2008 |
|---|---|---|
| EP | 2196906 | 6/2010 |

OTHER PUBLICATIONS

Jakub Majkowshi, Dynamic TXOP configuration for Qos enhancement in IEEE 802.11e wireless LAN, Oct. 1, 2006.*
Wikipedia [online] "WS-Reliable Messaging" Last modified Jan. 21, 2011 [Retrieved from the Internet Apr. 26, 2011] http://en.wikipedia.org/wiki/WS=ReliableMessaging.

(Continued)

*Primary Examiner* — Lechi Truong
(74) *Attorney, Agent, or Firm* — Fish & Richardson P.C.

(57) ABSTRACT

The present disclosure involves systems, software, and computer implemented methods for providing high-load business process scalability in cloud-based infrastructures. One process includes operations for receiving a message at a first computer node executing a first business process instance. A second business process instance associated with the message is identified. The message is sent to a messaging queue for retrieval by the second business process instance if the second business process instance is not located at the first computer node.

20 Claims, 7 Drawing Sheets

(56) References Cited

U.S. PATENT DOCUMENTS

| | | | |
|---|---|---|---|
| 2003/0182464 A1* | 9/2003 | Hamilton et al. | 709/314 |
| 2006/0026287 A1* | 2/2006 | Ternullo | 709/227 |
| 2009/0327282 A1 | 12/2009 | Wittig et al. | |
| 2010/0205164 A1* | 8/2010 | Schofield | 707/704 |
| 2010/0286992 A1* | 11/2010 | Tkatch et al. | 705/1.1 |
| 2012/0005724 A1 | 1/2012 | Lee | |
| 2012/0158966 A1 | 6/2012 | Eberlein et al. | |

OTHER PUBLICATIONS

Wikipedia [online] "Two-phase commit protocol" Last modified Apr. 26, 2011 [Retrieved from the Internet Apr. 26, 2011] http://en.wikipedia.org/wiki/Two-phase_commit_protocol.

Extended European Search Report issued in European Application No. 12002449.2 on Jun. 29, 2012; 9 pages.

Ales, A Real-time Java component Model, 2008.

* cited by examiner

HIGH-LOAD BUSINESS PROCESS SCALABILITY

CLAIM OF PRIORITY

This application is a Continuation of and claims priority under 35 USC §120 to U.S. patent application Ser. No. 13/094,366 filed on Apr. 26, 2011 issued as U.S. Pat. No. 8,561,080 on Oct. 15, 2013, the entire contents of which are hereby incorporated herein by reference.

TECHNICAL FIELD

The present disclosure relates to software, computer systems, and computer implemented methods for providing high-load business process scalability.

BACKGROUND

The increased use of high bandwidth networks and data connections, and high capacity data storage servers, has resulted in the implementation of different deployment models such as cloud computing solutions. In cloud computing solutions, resources, services, enhanced functionality, or software can be provided to a client computer across a network. The resources can be shared among multiple clients through virtualization techniques to achieve improved resource utilization and scaling effects. Cloud computing models can also be used to provide shared access and remote storage of data to users. In cloud computing solutions, computing resources are provided as hosted services across a network such as the Internet. These services can include on-demand services that are provided through a cloud computing network without installation of applications or software on a client computer.

Companies employ business process management suites (BPMS) to model, document, automate, govern, optimize, simulate, and monitor core business processes and complex repetitive tasks. In some instances, an on-demand BPMS achieves scalability or elasticity by dynamically assigning additional cloud instances (computer nodes) to handle additional workload. At the same time, a cloud-based BPMS is connected to a wide range of other software components, including client software running on mobile devices, on-premise business software installations (e.g., enterprise resource planning systems), web-based clients, other cloud-based business software, and other software run by business partners. Business processes in the BPMS system can exchange events with those external software components.

SUMMARY

The present disclosure describes techniques for providing high-load business process scalability in cloud-based infrastructures. A computer program product is encoded on a tangible storage medium, where the product comprises computer readable instructions for causing one or more processors to perform operations. These operations can include receiving a message at a first computer node executing a first business process instance. A second business process instance associated with the message is identified. The message is sent to a messaging queue for retrieval by the second business process instance if the second business process instance is not located at the first computer node.

While generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure generally describes computer systems, software, and computer implemented methods for providing high-load business process scalability in cloud-based infrastructures. In cloud computing or cluster node infrastructures, multiple computer nodes, or cloud instances, can be used to provide an application or service to external components and users. An event received at a first cloud or cluster node instance (hereafter referred to as a "cloud instance") may need to be forwarded to a second, receiving cloud instance for processing. An event is a message or request exchanged between applications and/or business processes. Instead of immediately communicating with the receiving cloud instance to initiate processing of the event, the event is persisted in a database-backed event queue. The receiving cloud instance may then retrieve the event from the event queue for dispatch to a locally running process instance for consumption of the event. In some implementations, a notification call to the receiving cloud instance will trigger the receiving cloud instance to retrieve the event without delays. The receiving process instance can consume the event at an appropriate time based on its internal state.

Business processes are run by business process management suites (BPMS), orchestrating process steps such as automated activities, user tasks, and events that synchronize a process with other components. These process steps often interact with external applications and devices. For instance, a user task may be sent to a user's mobile device where it is processed, passing back data to the underlying business process. In another example, an RFID reader may send a signal to a business process where it is consumed in an event to trigger certain follow-up actions. In another example, a business process calls out from an automated activity to an enterprise resource planning (ERP) system to alter a business object (e.g., an invoice or material master data) that is managed there.

In some implementations, BPMS systems can be offered as on-demand installations in a cloud computing network to support on-demand business applications and to benefit from a low total cost of ownership that comes with the intrinsic elasticity and scalability characteristics of the cloud infrastructure. Technically, a single BPMS installation is distributed across a dynamic range of computer "nodes" provided by the underlying cloud infrastructure. Those nodes jointly run a number of business processes. The number of nodes may grow whenever there is a larger workload to be processed at a time or shrink whenever there is a smaller workload to be processed. Some of the nodes may execute different instances of particular business processes, while other nodes may execute entirely different business processes in various implementations.

Figure 1:
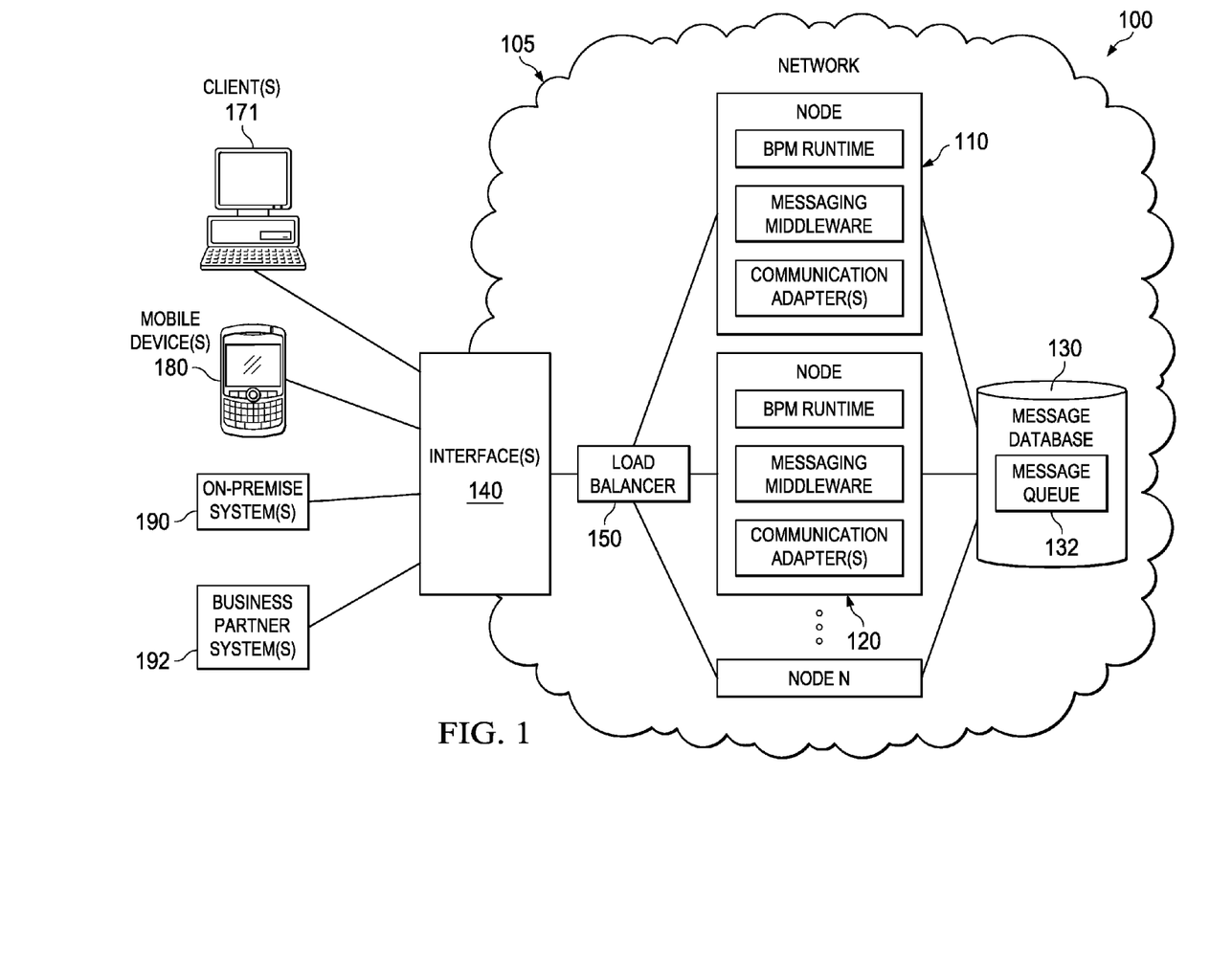
FIG. 1 illustrates an example environment for a distributed business process management suite in a cloud network.

Turning to the illustrated example, FIG. 1 illustrates an example environment 100 for executing business processes associated with business process management suites (BPMS) in a cloud-based infrastructure. The illustrated environment 100 includes or is communicably coupled with a plurality of components in a network such as cloud network 105. In general, environment 100 depicts an example configuration of a system capable of orchestrating process steps such as automated activities, user tasks, and events within cloud network 105 in synchronization with external applications and devices, such as mobile devices 180 or clients 171. The BPMS can be distributed across multiple computer nodes in the cloud network 105, including nodes 110, 120, and so on. As used in the present disclosure, the terms "computer node" and "cloud instance" may be used interchangeably as appropriate without departing from the scope of this disclosure. In cluster computing environments (not illustrated), the terms "computer node" and "cloud instance" may be also analogous to a "cluster node."

Each computer node in network 105 can include a plurality of different components needed to run a number of business processes or process instances. For example, as depicted in FIG. 1, the computer nodes can include a business process management (BPM) runtime environment, messaging middleware, or communication adapters. The internal components at the computer nodes allow the computer node to perform process steps associated with the BPMS, communicate with other computer nodes or external components, receive and respond to events from external components, and execute business processes. The implementation of the BPMS in a cloud computing environment provides flexibility and scalability to the BPMS by assigning additional computer nodes when needed to handle additional workload.

As seen in FIG. 1, a cloud-based BPMS can also be connected to other external software components for providing on-demand services to the external software components. For example, the BPMS can be connected to external components including one or more clients 171, mobile devices 180, on-premise systems 190, and other business partner systems 192. The external components can run client software components that interact with the BPMS through the cloud network 105. Business processes running at the computer nodes 110 and 120 can exchange events with the external software components. Further, the cloud network 105 can also include components for facilitating communications between the external components and computer nodes, such as interfaces 140 for managing and synchronizing communications in the cloud network 105 and/or a load balancer 150 for managing distribution of workload among computer nodes. A typical load balancer 150 can be used to divide a total workload into smaller work packages of fixed size before assigning the work packages to available work processes. Generally, the typical load balancer 150 receives a message and distributes the message to an available node, although not necessarily to a particular node associated with the received message or to a node where the receiving process instance is running.

The exchange of events among business processes and external components may require the business processes to consistently synchronize their internal state to the received events. When an event is received by a business process, the business process needs to reliably react to the event in order to achieve an intended effect on the control flow and data flow of the business process. Accordingly, the state of the business process needs to be synchronized in a transactional manner in order to maintain the business process' consistency with external components. In other words, the state of the business process should reflect the state of the external components interacting with the business process at any discrete point in time.

In some instances, the business process and external component can be synchronously coupled to ensure consistency in states. Dedicated distributed transactional protocols, such as Two-Phase Commit, for example, synchronously couple two business applications, such as a BPMS and an external software component. That is, both applications hold their individual state on different computer nodes and perform actions of a single logical transaction simultaneously (e.g., persisting a snapshot of their state on a database). Synchronously coupling different software components and different computer nodes, however, may not be efficient for business applications that process high workloads and need to comply with service-level agreements (SLAs) regarding processing throughput and latencies. By requesting another application to perform an action simultaneously with the requesting application, neither the other application's current availability nor its underlying infrastructure is taken into account. In effect, the other application may currently not be able to respond to the request such that the entire transaction is delayed. This problem is aggravated when a computer node needs to serve multiple requests at a time. In essence, distributed transaction protocols that rely on synchronous coupling do not scale on a cloud-based infrastructure.

In order to avoid synchronous coupling, reliable, asynchronous protocols, may be employed. Asynchronous protocols may pass an event from an external software component to a business process in an asynchronously de-coupled fashion, only guaranteeing that the event will eventually be delivered. Similarly, business processes may also pass back events to the external software component in this way. The asynchronous protocols avoid the blocking characteristics of distributed transactions. These protocols, however, require a loose coupling between a business process and an external software component. For example, the asynchronous functions, such as waiting for an incoming event, need to be explicitly modeled into the business process. Further, the external software component (e.g., an ERP system) may not be configured to understand what the receiving software components of an event are or on which specific computer node a receiving software component (like a business processes instance) is currently running. Accordingly, certain event correlation mechanics (which may be part of a BPMS or other messaging middleware) are required to dispatch the event to the receiving software components.

In certain implementations, a cluster-enablement protocol can be used to address problems with scalability in a cloud-based BPMS implementation. A cluster-enablement protocol can rely on an eviction algorithm to transport full process instances between two computer nodes. In particular, the receiving process instance is transported to the node where the event was received. In some instances, a software component issues a request on a first computer node while the affected process instance that is supposed to receive the request is currently running on a second, different computer node. The process instance associated with the first computer node may be evicted from the first computer node and migrated to the second, different computer node in order to process the event while maintaining transactional synchronization with the event.

For example, as depicted in FIG. 1, an external software component (e.g., task management software) running on an external device at client 171 can submit an event to a BPMS distributed across multiple nodes, including nodes 110 and 120. Initially, the event can be received by load balancer 150, which selects one of the nodes under its management to send the event to. In the present example, the event is sent to a particular process instance at node 110, but the consumption of the event may need to be performed at a different node 120. Based on a cluster-enablement protocol, the BPMS waits for the process instance at node 110 to reach an idle state, such as when waiting for a user task to be completed. During the idle state, the process instance at node 110, including its state information, is evicted from the node 110 and persisted onto a database. Node 120 then recovers the process instance by loading the state information from the database and resuming the process instance at node 120. The received event is then passed to the process instance at node 120, which effectively synchronizes the process state.

The cluster-enablement protocol may result in latency and throughput issues in certain situations. First, performance of the business processes in the BPMS may be adversely affected when the process instances are associated with complex states. Many customer scenarios come with large process models that employ deeply nested subflow invocations. In effect, the process state that needs to be persisted and fetched to and from the database in a cluster transport may be prohibitively large and may generate substantial load on the database. Further, certain factors may cause frequent cluster transports, which can further occupy system resources. Some business process models contain many artifacts that may trigger a cluster transport. Examples of artifacts that may trigger cluster transports are human activities (e.g., user tasks), intermediate message catch events, timer events, and sending responses to synchronous process interfaces. Generally, each occurrence of these artifacts may trigger transporting a process instance across a cluster, which can be a costly operation for system resources. Third, the cluster protocol makes use of synchronous communications between the nodes which limits scalability due to intrinsic availability constraints.

Additionally, many process models may rarely encounter an idle state, which is a prerequisite for performing a cluster transport. A number of artifacts can inhibit idle situations, such as sequential or parallel loops, automated activities invoking long-running services (e.g., ERP Enterprise Services), and customer-provided data mapping functions which can be arbitrarily complex and, hence, consume processing time in an unpredictable manner. When the artifacts reside on parallel branches in any subflow of the calling stack, they may temporarily inhibit the process from being evicted as part of a cluster transport. In effect, the request to deliver an event to the process fails and needs to be repeated later, which can hamper message throughput.

In a cloud-based infrastructure, the events transmitted by an external component can arrive at a particular cloud instance while the receiving process instance that will be processing the event may reside on another cloud instance. A protocol to consistently dispatch the events to the receiving business processes in a distributed cloud infrastructure can be provided. In some implementations, the protocol may introduce no costly protocol overhead and need not depend on a business process being "idle" to receive an event. When either the number of events or the number of process instances increases, both process turnaround times and overall process end-to-end throughput can be easily compensated for by assigning additional cloud instances to handle the additional workload. Further, by persisting an event at a centralized database, I/O and network load can be reduced because the receiving process instance does not need to be transported across clusters in the cloud network. Also, the latency associated with successfully delivering an event to the BPMS runtime is greatly reduced. An event no longer needs to wait for the receiving process instance to be transported across the cluster in order to complete the delivery transaction. Finally, the likelihood of failing to deliver an event is also substantially reduced because a process instance that is unable to be transported across a node cluster can no longer inhibit or withhold the event from being delivered.

The present disclosure addresses the challenges associated with high-load processing in a cloud computing infrastructure by de-coupling event receipt and consumption in a business process both physically and asynchronously. That is, when an event is received on a first cloud instance it is persisted in a database-backed event queue for the receiving business process, which may be running at a second cloud instance. The second cloud instance running the receiving business process will regularly fetch newly arrived events from the queue and dispatch them to the locally running process instance where the event is consumed. The second cloud instance can, in some instances, fetch new events based on polling of the event queue. In some implementations, an optional notification call will actively trigger the second cloud instance once the event has been put into the queue, eliminating polling delays.

The receiving process instance is free to consume the event based on its internal state and availability without blocking the transaction that has issued the event on the first cloud instance. For instance, task management software may autonomously set the status of a user task that was created by a business process running on another cloud instance from "in progress" to "completed". In effect, an event will be generated and persisted (i.e., enqueued for that process instance) for the affected process to be picked up on its own cloud instance in a separate, asynchronously de-coupled transaction. External components may, in certain instances, send events to the process without running into locking conflicts. In rare instances, when both the external component and the business process access joint state variables, a lock may need to be acquired from a central locking provider. The locking can be avoided by packaging any state changes into separate event entities that are only generated when the external software component issues the event. Generally, however, business processes manage private resources and do not directly access external resources while external components generally do not manipulate internal process resources.

Figure 2:
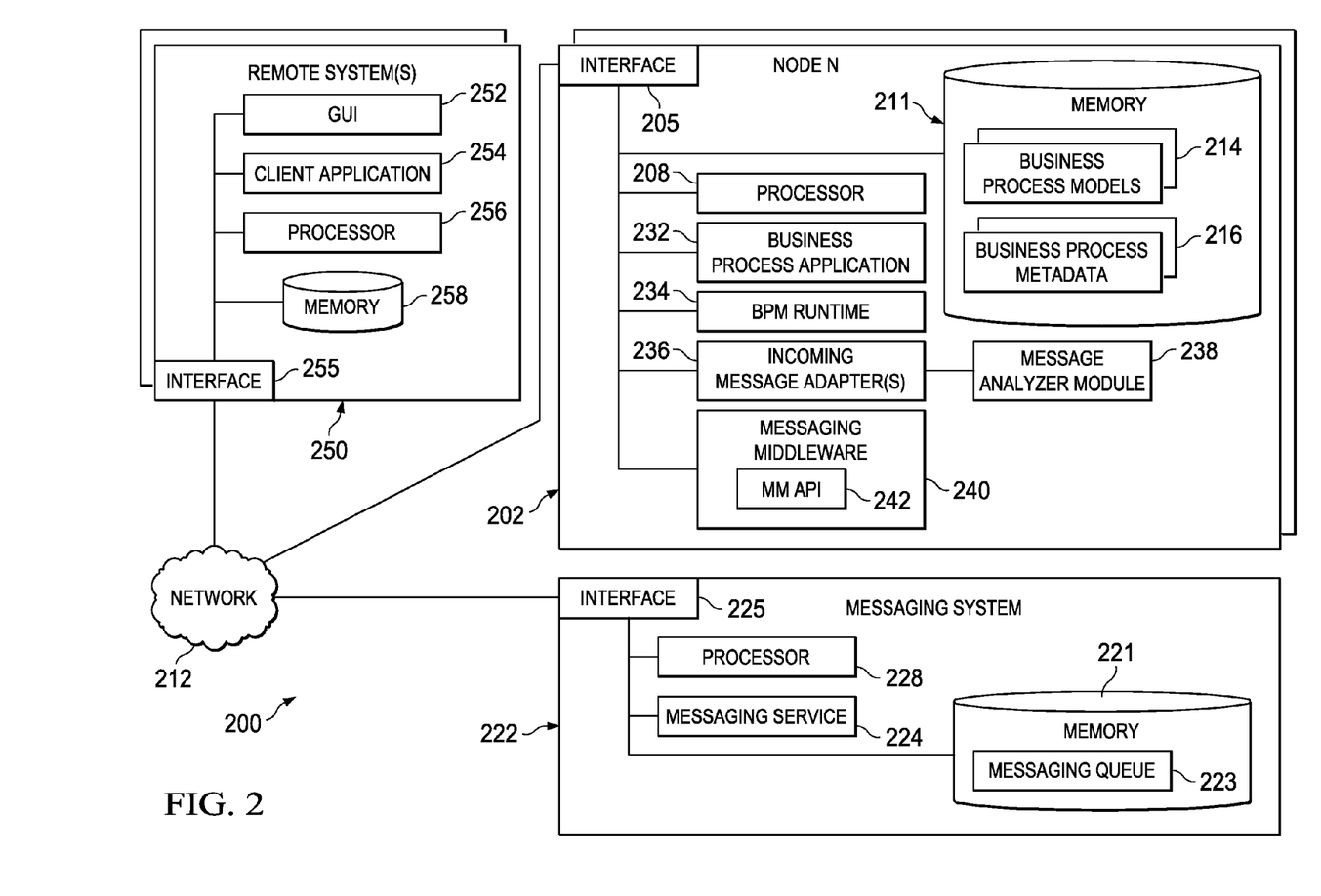
FIG. 2 illustrates a diagram of example components included in a computer node and a messaging system.

FIG. 2 illustrates an environment 200 showing example components in a computer node 202 and messaging system 222 for providing high-load business process scalability in cloud-based infrastructures. Environment 200 includes one or more remote systems 250, a computer node 202, and a messaging system 222, at least some of which communicate across network 212. In general, environment 200 depicts an example configuration of components used in a BPMS for processing events received from external components. Computer node 202 represents an example node in a BPMS implementation such as described above in relation to FIG. 1. The BPMS implementation can include more than one node, and each node may include fewer, more, or different components depending on the implementation. In certain instances, node 202 and messaging system 222 can be logically grouped and accessible within a cloud computing network. Accordingly, the BPMS may be provided as an on-demand solution through the cloud computing network as well as a traditional server-client system or a local application at remote system 250.

In general, node 202 can be any electronic computing device, such as a server, operable to receive, transmit, process, store, or manage data and information associated with the environment 200. Node 202 can be a server that stores one or more business process applications 232, where at least a portion of the business process applications are executed via requests and responses sent to users or clients within and communicably coupled to the illustrated environment 200 of FIG. 2. In some instances, node 202 can store a plurality of various business process applications 232, while in other instances, node 202 can be a dedicated server meant to store and execute only a single business process application 232. In some instances, node 202 can comprise a web server or be communicably coupled with a web server, where the business process applications 232 represent one or more web-based applications accessed and executed via network 212 by remote system 250 to perform the programmed tasks or operations of the business process application 232.

Node 202 illustrated in FIG. 2 can be responsible for receiving application requests (i.e., events) from one or more client applications or business applications associated with the remote system 250 of environment 200, responding to the received requests by processing said requests in the business process application 232, and sending the appropriate response from the business process application 232 back to the requesting client application if the received request is a synchronous request. Node 202 may also receive requests and respond to requests from other components on network 212, such as the messaging system 222 or other nodes not illustrated in FIG. 2. Alternatively, the business process application 232 at node 202 can be capable of processing and responding to requests from a user locally accessing node 202. Accordingly, in addition to requests from the remote system 250 illustrated in FIG. 2, requests associated with the business process applications 232 may also be sent from internal users, external or third-party customers, other automated applications, as well as any other appropriate entities, individuals, systems, or computers.

As used in the present disclosure, the term "computer" is intended to encompass any suitable processing device. For example, although FIG. 2 illustrates a single node 202 comprising a computer, environment 200 can be implemented using one or more nodes, as well as computers other than servers, including a server pool. Indeed, node 202, remote system 250, and messaging system 222 can be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated nodes 202, remote system 250, and messaging system 222 may be adapted to execute any operating system, including Linux, UNIX, Windows, Mac OS, or any other suitable operating system.

In the present implementation, and as shown in FIG. 2, node 202 includes a processor 208, an interface 205, a memory 211, and one or more business process applications 232. The interface 205 is used by the node 202 for communicating with other systems in a client-server or other distributed environment (including within environment 200) connected to the network 212 (e.g., remote system 250, as well as other systems communicably coupled to the network 212). Generally, the interface 205 comprises logic encoded in software and/or hardware in a suitable combination and operable to communicate with the network 212. More specifically, the interface 205 may comprise software supporting one or more communication protocols associated with communications such that the network 212 or interface's hardware is operable to communicate physical signals within and outside of the illustrated environment 200.

In some implementations, node 202 may also include a user interface, such as a graphical user interface (GUI). The GUI comprises a graphical user interface operable to, for example, allow the user of the server 202 to interface with at least a portion of the platform for any suitable purpose, such as creating, preparing, requesting, or analyzing data, as well as viewing and accessing source documents associated with business transactions. Generally, the GUI provides the particular user with an efficient and user-friendly presentation of business data provided by or communicated within the system. Specifically, the GUI may, for instance, be used to present user tasks originating from a business process. The GUI may also provide general interactive elements that allow a user to access and utilize various services and functions of business process application 232. The GUI is often configurable, supports a combination of tables and graphs (bar, line, pie, status dials, etc.), and is able to build real-time portals, where tabs are delineated by key characteristics (e.g. site or micro-site). Therefore, the GUI contemplates any suitable graphical user interface, such as a combination of a generic web browser and command line interface (CLI) that processes information in the platform and efficiently presents the results to the user visually.

Generally, example node 202 may be communicably coupled with a network 212 that facilitates wireless or wireline communications between the components of the environment 200 (i.e., between node 202 and remote system 250), as well as with any other local or remote computer, such as messaging system 222, additional clients, servers, or other devices communicably coupled to network 212 but not illustrated in FIG. 2. In the illustrated environment, the network 212 is depicted as a single network in FIG. 2, but may be a continuous or discontinuous network without departing from the scope of this disclosure, so long as at least a portion of the network 212 may facilitate communications between senders and recipients.

The network 212 may be all or a portion of an enterprise or secured network, while in another instance at least a portion of the network 212 may represent a connection to the Internet. In some instances, a portion of the network 212 may be a virtual private network (VPN), such as, for example, the connection between remote system 250 and node 202. Further, all or a portion of the network 212 can comprise either a wireline or wireless link. Example wireless links may include 802.11a/b/g/n, 802.20, WiMax, and/or any other appropriate wireless link. In other words, the network 212 encompasses any internal or external network, networks, sub-network, or combination thereof operable to facilitate communications between various computing components inside and outside the illustrated environment 200. The network 212 may communicate, for example, Internet Protocol (IP) packets, Frame Relay frames, Asynchronous Transfer Mode (ATM) cells, voice, video, data, and other suitable information between network addresses. The network 212 may also include one or more local area networks (LANs), radio access networks (RANs), metropolitan area networks (MANs), wide area networks (WANs), all or a portion of the Internet, and/or any other communication system or systems at one or more locations.

Remote system 250 may have access to resources such as node 202 within network 212. In certain implementations, the servers within network 212, including node 202 in some instances, may comprise a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. Remote system 250 can use cloud-based services to quickly receive software upgrades, applications, and other resources that would otherwise require a lengthy period of time before the resources can be delivered to the remote system 250. Additionally, other devices may also have access to cloud-based services, such as on-demand services provided by servers accessible through network 212. Further, a cloud platform deployment implementation is not a required element of the present disclosure, and other distributed infrastructures such as cluster-based systems can also be used.

As described in the present disclosure, on-demand services can include multiple types of services and business processes, such as products, actionable analytics, enterprise portals, managed web content, composite applications, or capabilities for creating, integrating, using and presenting business applications. For example, a cloud-based implementation can allow remote system 250 to transparently upgrade from an older user interface platform to newer releases of the platform without loss of functionality.

As illustrated in FIG. 2, node 202 includes a processor 208. Although illustrated as a single processor 208 in FIG. 2, two or more processors may be used according to particular needs, desires, or particular embodiments of environment 200. Each processor 208 may be a central processing unit (CPU), a blade, an application specific integrated circuit (ASIC), a field-programmable gate array (FPGA), or another suitable component. Generally, the processor 208 executes instructions and manipulates data to perform the operations of node 202 and, specifically, the one or more plurality of business process applications 232. Specifically, the server's processor 208 executes the functionality required to receive and respond to requests from the remote system 250 and their respective client applications 144, as well as the functionality required to perform the other operations of the business process application 232.

Regardless of the particular implementation, "software" may include computer-readable instructions, firmware, wired or programmed hardware, or any combination thereof on a tangible, non-transitory, medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 2 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 200, processor 208 executes one or more business process applications 232 on node 202.

At a high level, each of the one or more business process applications 232 is any application, program, module, process, or other software that may execute, change, delete, generate, or otherwise manage information according to the present disclosure, particularly in response to and in connection with one or more requests received from the illustrated remote system 250 and its associated client applications 254 or from other servers or components through a network 212. In certain cases, only one business process application 232 may be located at a particular node 202. In others, a plurality of related and/or unrelated business process applications 232 may be stored at a single node 202, or located across a plurality of other nodes 202, as well. In certain cases, environment 200 may implement a composite business process application 232. For example, portions of the composite application may be implemented as Enterprise Java Beans (EJBs) or design-time components may have the ability to generate runtime implementations into different platforms, such as JEE (Java Platform, Enterprise Edition), ABAP (Advanced Business Application Programming) objects, or Microsoft's .NET, among others.

Additionally, one or more of the business process applications 232 may represent web-based applications accessed and executed by remote system 250 or client applications 254 via the network 212 (e.g., through the Internet). Further, while illustrated as internal to node 202, one or more processes associated with a particular business process application 232 may be stored, referenced, or executed remotely. For example, a portion of a particular business process application 232 may be a web service associated with the application that is remotely called, while another portion of the business process application 232 may be an interface object or agent bundled for processing at a remote system 250. Moreover, any or all of the business process applications 232 may be a child or sub-module of another software module or enterprise application (not illustrated) without departing from the scope of this disclosure. Still further, portions of the business process application 232 may be executed by a user working directly at node 202, as well as remotely at remote system 250.

As illustrated, node 202 can also include a business process management (BPM) runtime 234 that provides services, libraries, and tools for executing business process applications 232. A business process instance is an executing instance of a particular business process. In some cases, multiple instances of the same business process can be running (e.g., multiple discrete purchase orders may be generated concurrently by different business process instances). Further, multiple instances of the same business process can be running at different nodes such that each business process instance is associated with information specific to the node hosting the business process instance.

The BPM runtime 234 can also handle any state changes to business processes, including state changes associated with execution of process steps based on received events. Node 202 also includes messaging middleware 240. Messaging middleware 240 can comprise a software or hardware infrastructure configured to facilitate sending and receiving messages between distributed systems and provide for transactional (failover-safe) message delivery, message queuing, and publish/subscribe features. Generally, messaging middleware 240 allows application modules to be distributed over heterogeneous platforms, and reduces the complexity of developing applications that span multiple operating systems and network protocols by insulating the application developer from the details of the various operating system and network interfaces. In some instances, the messaging middleware 240 can provide methods and techniques for sending messages to and receiving messages from the messaging system 222 and its messaging queue 223. The messaging middleware 240 of node 202 can also provide messaging middleware application programming interfaces (API) 242, such as Java Message Service (JMS) APIs for example, that allow interaction between node 202 and diverse platforms across different networks.

One or more incoming message adapters 236 can also be included in node 202. The incoming message adapter 236 comprises hardware or software components used to receive messages or events received from external components such as remote system 250, other nodes, or messaging system 222. The incoming message adapter can also be coupled with a message analyzer module 238. Message analyzer module 238 can be any application configured to analyze received events to determine an appropriate recipient for the event. In some instances, message analyzer module 238 can determine a queue into which the received event should be routed to. The event may need to be consumed at a particular node or by a specific process instance based on the external component transmitting the event or on other context information associated with the event. In some instances, the message analyzer module 238 may identify a received event as an event associated with a business process instance executing on the same node 202. In those instances, the received event or message can be consumed without forwarding or sending the message to the messaging queue 223 or another system.

In general, node 202 also includes memory 211 for storing data and program instructions. Memory 211 may include any memory or database module and may take the form of volatile or non-volatile memory including, without limitation, magnetic media, optical media, random access memory (RAM), read-only memory (ROM), removable media, or any other suitable local or remote memory component. Memory 211 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of node 202 and its one or more business process applications 232.

Memory 211 can also store data objects such as business process models 214 and business process metadata 216. Business process models 214 can include data objects representing various aspects or processes of an enterprise, and business process metadata 216 can include any metadata associated with business processes that node 202 is managing or interacting with. In particular, memory 211 can hold process instance data such as instantiated process contexts, process tokens, and other process instance data. In some implementations, business process models 214 can be BPMN-based (Business Process Modeling Notation) models or BPEL-based (Business Process Execution Language) models.

The illustrated environment of FIG. 2 also includes one or more remote systems 250. Each remote system 250 may be any computing device operable to connect to or communicate with at least node 202 and/or via the network 212 using a wireline or wireless connection. Further, as illustrated in FIG. 2, remote system 250 includes a processor 256, an interface 255, a client application 254, and a memory 258. In some instances, remote system 250 can also include a graphical user interface (GUI) 252. In general, remote system 250 comprises an electronic computer device operable to receive, transmit, process, and store any appropriate data associated with the environment 200 of FIG. 2. It will be understood that there may be any number of remote system 250 associated with, or external to, environment 100. For example, while illustrated environment 200 includes remote system 250, alternative implementations of environment 200 may include multiple clients communicably coupled to node 202, or any other number of clients suitable to the purposes of the environment 200. Additionally, there may also be one or more additional remote systems external to the illustrated portion of environment 200 that are capable of interacting with the environment 200 via the network 212. The term "remote system" may also refer to any computer, application, or device, such as a mobile device, that is communicably coupled to one or more servers through a network 212. Moreover, while each remote system 250 is described in terms of being used by a single user, this disclosure contemplates that many users may use one computer, or that one user may use multiple computers.

In some implementations, remote system 250 can be a client system, and GUI 252 may be associated with remote system 250. In these instances, GUI 252 comprises a graphical user interface operable to, for example, allow the user of remote system 250 to interface with at least a portion of the platform for any suitable purpose, such as creating, preparing, requesting, or analyzing data, as well as viewing and accessing source documents associated with business transactions. Generally, the GUI 252 provides the particular user with an efficient and user-friendly presentation of business data provided by or communicated within the system. The GUI 252 may comprise a plurality of customizable frames or views having interactive fields, pull-down lists, and buttons operated by the user. Generally, GUI 252 may also provide general interactive elements that allow a user to access and utilize various services and functions of application 254. The GUI 252 is often configurable, supports a combination of tables and graphs (bar, line, pie, status dials, etc.), and is able to build real-time portals, where tabs are delineated by key characteristics (e.g. site or micro-site). Therefore, the GUI 252 contemplates any suitable graphical user interface, such as a combination of a generic web browser, intelligent engine, and command line interface (CLI) that processes information in the platform and efficiently presents the results to the user visually. GUI 252, however, is not a required component of the present disclosure. In some instances, for example, remote system 250 may be a server or other component of an ERP system that does not necessarily include a GUI.

As used in this disclosure, remote system 250 can encompass a personal computer, touch screen terminal, workstation, network computer, kiosk, wireless data port, smart phone, personal data assistant (PDA), one or more processors within these or other devices, or any other suitable processing device. For example, each remote system 250 may comprise a computer that includes an input device, such as a keypad, touch screen, mouse, or other device that can accept user information, and an output device that conveys information associated with the operation of the node 202 (and business process application 232) or the remote system 250 itself, including digital data, visual information, the client application 254, or the GUI 252. Both the input and output device may include fixed or removable storage media such as a magnetic storage media, CD-ROM, or other suitable media to both receive input from and provide output to users of remote system 250 through the display, namely, the GUI 252.

In some implementations, node 202 is also communicably coupled with a messaging system 222, which provides a messaging queue 223 stored in memory 221 for persisting incoming events. In some instances, memory 221 can be non-volatile memory or a database system. Messaging system 222 can be any electronic computing device configured to receive, store, or provide access to events or messages received from other components. In some instances, messaging system 222 is coupled with one or more nodes 202 as a backbone or back-end system, while in other instances, messaging system 222 represents a stand-alone system connected to a plurality of other nodes 202, devices and components through network 212. Messaging system 222 can include a processor 228, interface 225, or other components used to receive and manage events. In some implementations, messaging system 222 includes consistency and failover features through messaging middleware. Messaging middleware 226 at messaging system 222 can receive (enqueue) and forward (dequeue) messages in a transactional manner, without losing messages or delivering duplicate messages. Further, messaging middleware 226 can also provide for ordering of messages, such as First-In-First-Out (FIFO) ordering. In other words, the messaging middleware 226 at messaging system 222 can be used to persist incoming events for later retrieval by process instances. Although messaging middleware 226 can be implemented as a central database at messaging system 222, it can also be implemented using any appropriate means such as local persistency or with lazy replication techniques.

For example, external components such as remote system 250 can send events or requests to a particular node 202 in a cloud network. The event may need to be consumed at a different location, however, and node 202 can forward the event to messaging system 222 to persist the event in messaging queue 223 so that the appropriate business process can retrieve the event from the messaging queue 223 for consumption. The functionality provided by messaging system 222 for providing a queue for received events can be performed by messaging service 224. In certain implementations, messaging service 224 can also send a notification message to a particular node containing the process instance to be used for consuming a particular event stored in messaging queue 223. Notification messages can be also provided by the node 202 itself (such as through the messaging middleware 240) when messages or events are sent to the messaging queue 223. Although the messaging system 222 is depicted in FIG. 2 as being remotely located with respect to node 202, in some implementations, messaging system 222 can be located as part of one of the plurality of nodes or distributed across different nodes in a BPMS.

While FIG. 2 is described as containing or being associated with a plurality of elements, not all elements illustrated within environment 200 of FIG. 2 may be utilized in each alternative implementation of the present disclosure. For example, one or more of the elements described herein may be located external to environment 200, while in other instances, certain elements may be included within or as a portion of one or more of the other described elements, as well as other elements not described in the illustrated implementation. Further, certain elements illustrated in FIG. 2 may be combined with other components, as well as used for alternative or additional purposes in addition to those purposes described herein.

Figure 3:
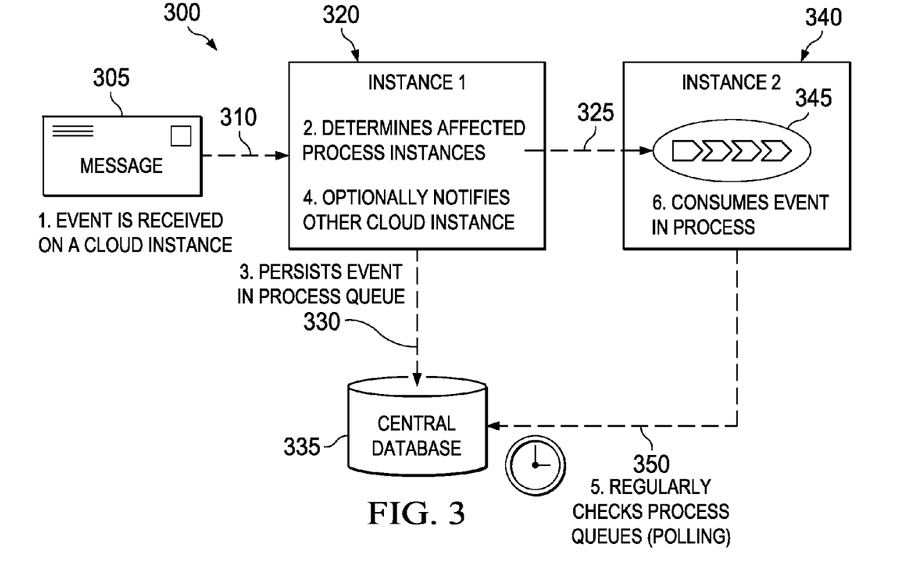
FIG. 3 is a flowchart of a process for dispatching an event to a process instance using an appropriate system, such as the system described in FIG. 2.

FIG. 3 illustrates an example process 300 for scalable event dispatching. As depicted in FIG. 3, a message (i.e., event) 305 is received on a first cloud instance 320 (i.e., computer node 320) at 310. The event 305 can be initially forwarded to a particular process instance in the computer node 320. In certain situations, the first computer node 320 may not have a process instance assigned to consume or associated with the event 305. Instead, one or more other business process instances located at other computer nodes may be the appropriate recipients of the event 305. Accordingly, the affected process instances are determined at 325. The determination of the affected process instances can include a correlation procedure where receiving process instances are matched to the incoming message based on the message payload and the processes' data context. In other cases, the message may already logically refer to one specific process instance such that no explicit correlation is required. The affected process instances 345 may be located at the first computer node 320 or at a different computer node 340. If the affected process instances 345 are located at a different computer node 340, the event 305 is enqueued into an instance-specific queue via messaging middleware at 330. In certain situations, multiple process queues can be hosted at a particular computer node, and each process queue is associated with a specific business process instance. Accordingly, messaging middleware can be used to identify the specific process queue for persisting event 305 based on a process instance identifier associated with the receiving process instance. As illustrated in FIG. 3, the process queue can be a database-backed process queue accessed through messaging middleware 335.

In any event, messaging middleware can provide interfaces that allow persistence of incoming events for later retrieval by receiving process instances. In some implementations, messaging middleware 335 can be implemented in connection with a centralized database in a repository or backbone system available to different process instances across multiple computer nodes, with each process instance having access to messaging queue 223 for retrieving events for consumption. Alternatively, messaging middleware 335 can rely on other approaches, such as replication protocols with local persistency, to provide distributed queues for incoming events. If the affected process instance is located at the same computer node as the node 320 that first received the event 305, the event 305 can be delivered to or consumed by the appropriate process instance without persisting the event 305 in messaging middleware 335.

In some implementations, the affected process instances 345 are actively notified through messaging middleware after determining which process instance is affected and after persisting the event 305 in the process queue. The notification call to computer node 340 can, in some instances, avoid delays in retrieving and consuming the event 305 by a process instance 345 at computer node 340. In some implementations, the computer node 340 containing the affected process instance 345 can perform regular polling of process queues at messaging middleware 335 at 350 to determine whether a particular event 305 has been received at the messaging middleware 335. The computer node 340 can then retrieve the event from the messaging middleware 335 after determining that an event 305 has been received for consumption by a process instance 345 at computer node 340. Once the event 305 has been retrieved at computer node 340, it can be consumed by process instance 345.

The forwarding of events to messaging middleware as described above in relation to FIG. 3 can be implemented across each node in a BPMS. In some instances, however, the events are persisted in messaging middleware only with respect to certain nodes of the BPMS, certain process instances, certain events received, or under certain conditions. By persisting events in a process queue 223 at a messaging system 222, the performance of a BPMS when exchanging events can be improved, especially in relation to certain scenarios. In situations where user tasks interact with the invoking process instance very frequently, persisting received events in a process queue 223 can decrease latency associated with frequent invoking of process instances. For example, a form that is presented to a plurality of users who need to fill in data in the form and pass the form back to the process instance after completion can occupy resources because any user-triggered task status change could result in an event sent to a process instance. Given the relatively long processing times of user tasks, passing task status change events to the process instance through a messaging middleware polling approach can be beneficial to performance of the BPMS.

Figure 4:
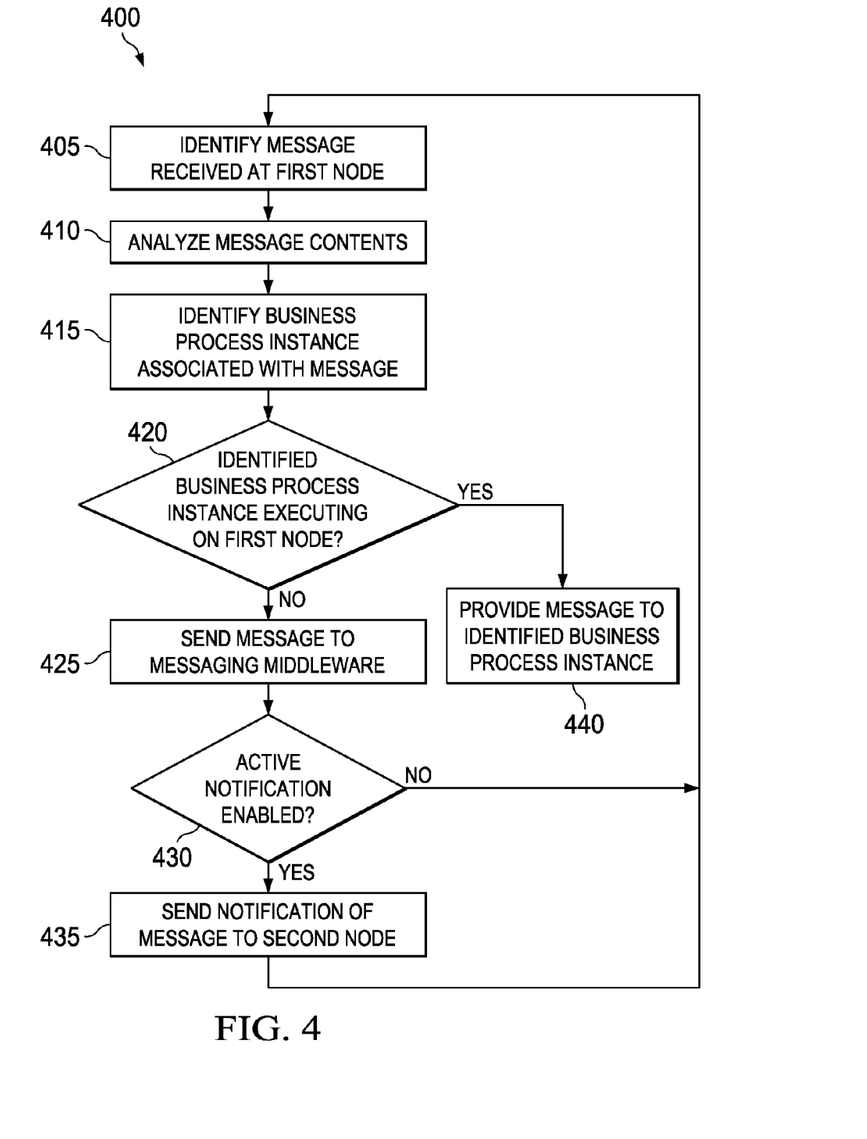
FIG. 4 is a flowchart of a process for handling a message received at a computer node from an external component using an appropriate system, such as the system described in FIG. 2.

FIG. 4 illustrates an example process 400 for handling a message received at a computer node from an external component. First, a message received at a first computer node is identified at 405. The message can be a message or other information associated with an event that is received from an external software component at an external device, such as remote system 250. The contents of the received message are analyzed at 410. In particular, the business process instance associated with the message is identified at 415 during the analysis. For example, a particular business process instance may be assigned to process the message or perform certain actions based on the message. In some instances, the message may specify a particular business process instance with which the message is associated, while in other instances, the particular business process instance associated with the message may be derived based on a rule set or other method of association. Although the message may be received at the first computer node executing one or more business process instances, the assigned business process instance for the particular received message may not be located at the same computer node. Accordingly, a determination is made as to whether the identified business process instance is executing on the first node at 420.

If the identified business process instance is executing on the first node, the received message is provided to the identified business process instance at 440, where the message and its contents can be locally accessed and consumed on the first node. If the identified business process instance is not executing on the first node, the received message is to be processed at a second computer node. The location of the second computer node, however, may not be identified yet. Accordingly, the message is sent to messaging middleware at 425 for retrieval by the second computer node. In some implementations, active notification can be enabled within the messaging middleware in order to notify the second computer node of the message awaiting retrieval by the second computer node. Accordingly, a determination is made as to whether active notification has been enabled at 430. If active notification has been enabled, a notification message is sent to the second computer node at 435. The active notification can include information related to the particular message sent to the messaging queue at 435, or notification that a message associated with the second computer node is available at the messaging queue without further details. If the active notification has not been enabled, the process returns to normal operations and awaits arrival of further messages.

Figure 5:
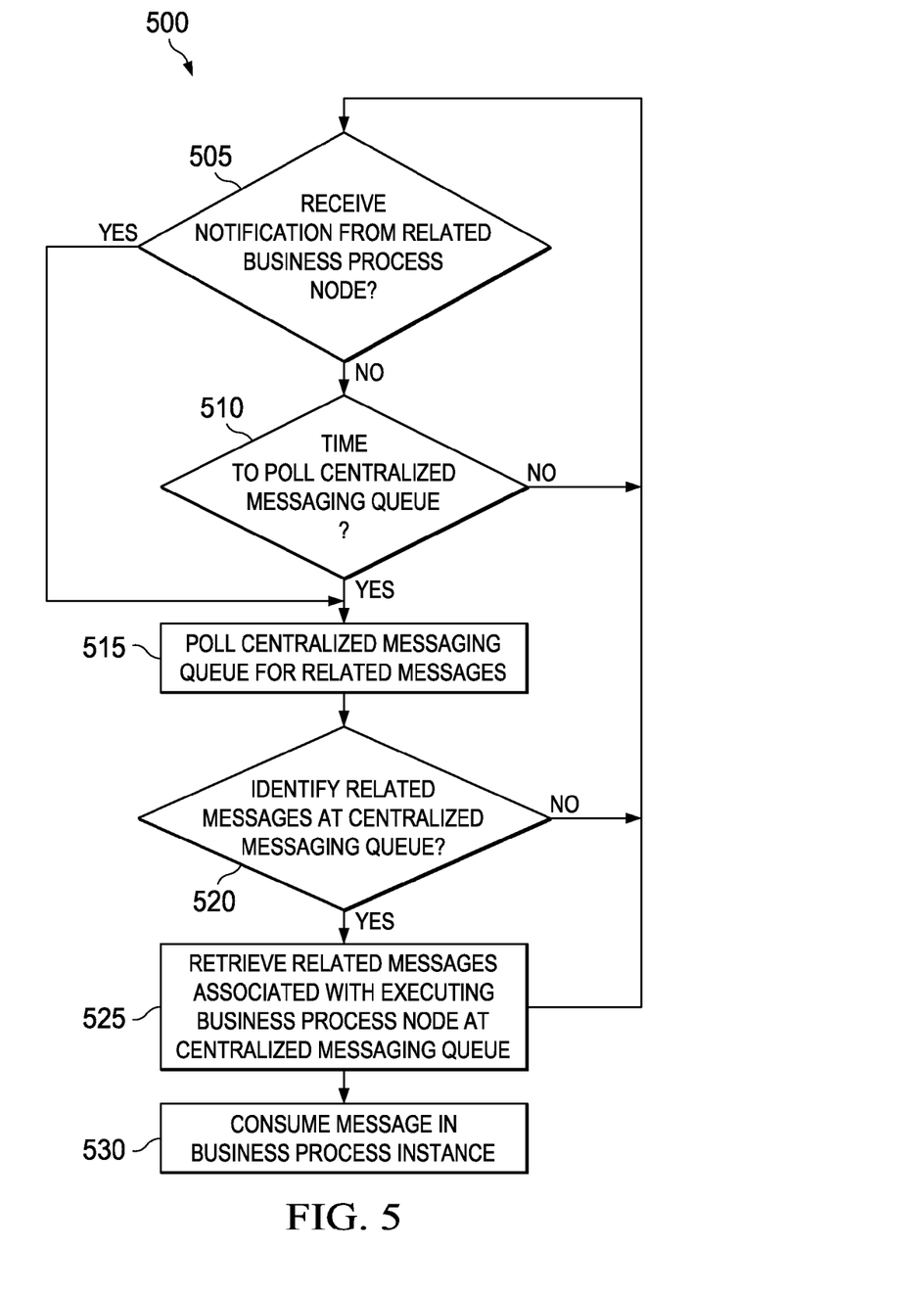
FIG. 5 is a flowchart of a process for retrieving related messages from a messaging queue using an appropriate system, such as the system described in FIG. 2.

FIG. 5 illustrates an example process 500 for retrieving related messages from a messaging queue. As described above in relation to FIG. 4, a message can be received at a first computer node but is then forwarded to a centralized messaging queue using messaging middleware after a determination that the message is to be consumed by or is related to a business process instance located at a second computer node other than the first computer node at which it is received. In some instances, a notification can be sent by messaging middleware to the second computer node to inform the second computer node of the availability of a message for retrieval from the centralized messaging queue. Accordingly, a determination is made at the second computer node whether a notification has been received indicating a possible message available for retrieval at 505.

In some implementations, the notification method is coupled with a polling approach. The receiving process instance may poll the message queue for pending messages at certain intervals but may immediately check the queue if a notification has been received from the first computer node. Accordingly, if a notification has been received indicating that a message is available for the second computer node in the message queue, the centralized messaging queue is polled for related messages at 515. If a notification has not been received, a determination is made at 510 as to whether it is time to poll the centralized messaging queue for any available messages for retrieval. The polling time for each business process instance may be different to allow for differences between the business processes being performed. Each business process instance can be associated with a polling time appropriate for that particular business process instance, depending on whether the process instance is a time-critical or non-time-critical process instance, for example. In some instances, the polling time can be manually modified by a user or administrator, set to a default value, or dynamically modified based on a calculation related to the average or median time in which new messages are received. In some instances, messages may be sent to a business process at differing times, such that a default polling time may be used. If it is not the time to poll the messaging queue, the process 500 returns to determining whether a notification is received from the related business process node (at 505). If it is time to poll the messaging queue, the second computer node polls the centralized messaging queue for related messages at 515. If there are no related messages stored in the centralized messaging queue at 520, the process 500 returns to determining whether a notification is received from messaging middleware (at 505). If there are related messages in the messaging queue, then the related messages are retrieved from the centralized messaging queue at 525. After a message is retrieved from the messaging queue, it is consumed in the appropriate business process instance at the second computer node at 530.

Figure 6:
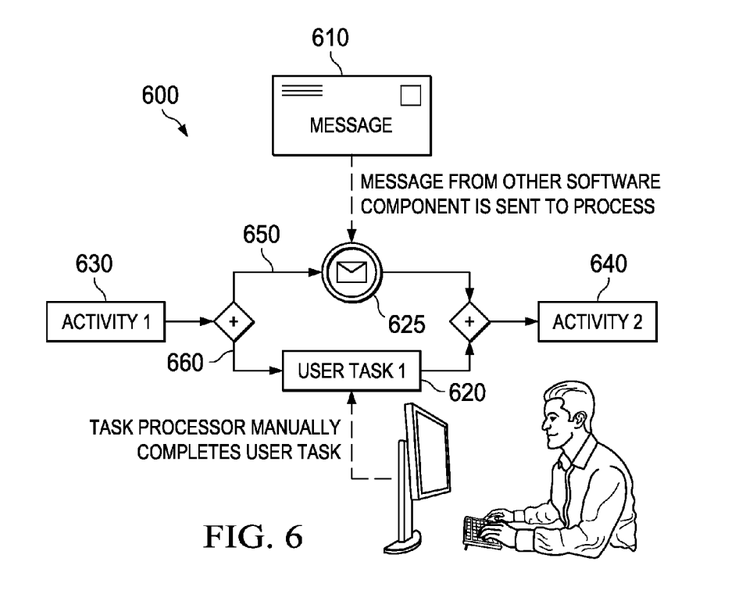
FIG. 6 is a diagram of an example business process for receiving messages and distributing the messages to a business process instance using an appropriate system, such as the system described in FIG. 2.

FIG. 6 illustrates an example business process 600 involving incoming messages. As depicted in FIG. 6, an example business process is initiated in connection with a first activity 630. During the business process, an Intermediate Message Event 625 waits for incoming messages on the upper process branch 650 and a User Task 620 is dispatched to a human processor, waiting to be completed on a lower branch 660. Both branches are triggered simultaneously. In other words, a message 610 for the Intermediate Message Event 625 may be received during, before, or after a user is processing the User Task 620 from the lower branch. A dedicated protocol for handling the intrinsic complexity of a cloud-based environment where any of the consumed events (e.g., the message 610 that is received by the Intermediate Message Event 625 or a task status change in the User Task 620) may be independently received on any cloud instance can be used. In fact, the business process may be running on a first cloud instance while the message for the Intermediate Message Event is received on another cloud instance (e.g., as routed and delivered by a generic load balancer) and the Web request from a user processing the task from his inbox is received on a third cloud instance. Both events (message 610 received by Intermediate Message Event 625 and task status change from a user 620) need to reach the business process in a reliable manner without introducing significant performance penalties or tampering with scale-out characteristics of the cloud network.

The persistence of received events in a messaging queue allows process instances to reside on a particular cloud instance for the lifetime of the process instance, sometimes referred to as business process "stickiness." Exceptions to this can include changes to the cloud topology (e.g., additional cloud instances are assigned to handle part of the load). In order to let the business processes receive events reliably and consistently in a transactional manner, any inbound event (e.g., the task status change 620 and the message 610 in FIG. 6) is locally persisted onto messaging middleware with a messaging queue 223 in the same transaction as when the inbound event is delivered to the BPMS runtime 234. When an event is received on a cloud instance that is different from the cloud instance where the receiving process(es) currently reside, the event is persisted in a database-backed queue for retrieval by the process instances that the event is supposed to be dispatched to. In some instances, an event may need to be dispatched to multiple process instances.

If the event is delivered to the cloud instance where the receiving process instance currently resides, the event is immediately delivered to the process instance, bypassing the messaging queue. Further steps may not be required here because the event is successfully delivered to the appropriate process instance for consuming the event. If the event is delivered to a cloud instance where the receiving process instance does not reside, however, the event may be persisted in a centralized messaging queue in order to deliver the event to the receiving process instance.

Figure 7:
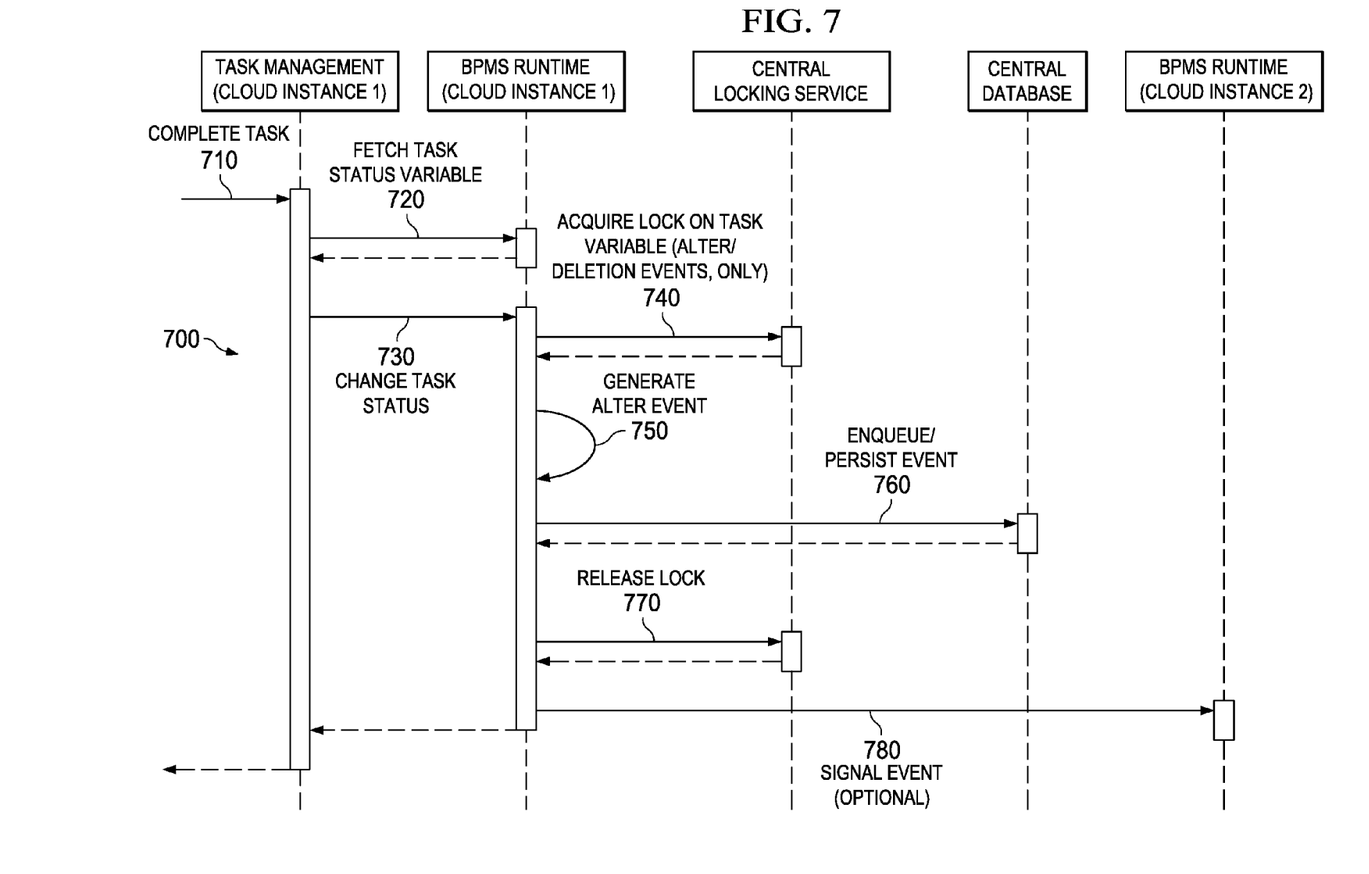
FIGS. 7 and 8 are diagrams illustrating an example process for dispatching messages to a cloud instance using an appropriate system, such as the system described in FIG. 2.
Figure 8:
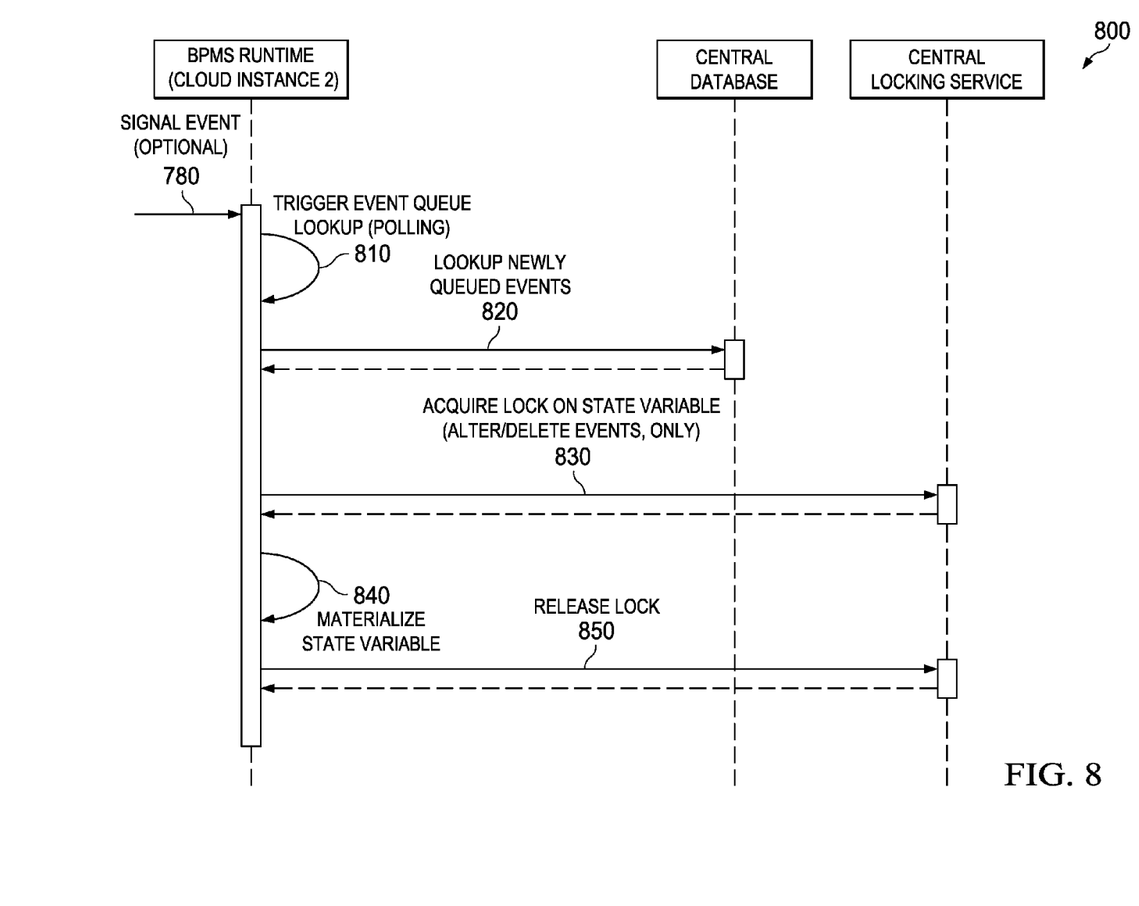

FIGS. 7 and 8 illustrate example processes 700 and 800 for dispatching one or more events to an appropriate cloud instance. In the illustrated example of FIG. 7, an indication of a completed user task can be received at a first cloud instance. The completed user task may be a user's indication that a particular task status associated with the user needs to be changed. Accordingly, the indication is received at the first cloud instance at 710. The task status variable can be fetched from the BPMS runtime associated with the first cloud instance at 720. The first cloud instance then submits a request to the BPMS runtime to change the task status at 730. In certain instances when shared states are involved, the type of event received by a cloud instance may require safeguarding or "locking" of process state variables to prevent unwanted changes to business process states while the business process state variables are updated with changes based on the received event. For example, some types of events trigger creation of new state variables. Since new state variables are, at the time of creation, still unknown to existing cloud instances, other process instances will not make unwanted changes to the new state variables and no locking mechanism is required. Certain types of events, however, may trigger alteration or deletion of existing state variables. In these instances, a central locking mechanism can be implemented to lock the existing state variables and prevent unwanted access to the state variables. Locking a state variable, however, is required only if that state variable could be manipulated by multiple components, processes, etc. at a time (i.e., the state variable is shared among them). In most cases, a locking protocol is not required.

Turning to the illustrated example, the change to a task status as submitted by a user may require locking of a state variable associated with the task status because the change requested results in modification of an existing state variable that is shared between the process instance that orchestrates the task and the task management component that presents the task to the user. As seen in FIG. 7, the BPMS runtime can acquire a lock on the task state variable by accessing a central locking service at 740 to prevent consistency violations with respect to the task state variable. Once the task state variable has been locked by the central locking service, the BPMS runtime can generate an alter event at 750 in response to the task change request received from the first cloud instance. The event is then persisted or enqueued in messaging middleware at 760, such as in messaging queue 223 as illustrated in FIG. 2, in order to dispatch the event to an appropriate receiving process instance to complete the task status change. After the event is passed to the central database, the lock on the task variable can be released by the central locking service at 770. In some implementations, a notification call can be sent to the cloud instance at which the receiving process instance is located to inform the cloud instance that an event is available for retrieval. In those instances, the notification can be sent as a signal event at 780 to the BPMS runtime associated with a second cloud instance associated with the receiving process instance.

In FIG. 8, the signal event can be received at the BPMS runtime of the second cloud instance at 780. On the node where the receiving process instance resides, certain mechanics can be implemented to allow local process instances to receive events. In some implementations, a receiving process instance can perform polling methods, or regular checks, on a related database queue for incoming events. The checks can be consolidated into a single, regular database lookup which checks the process queues for all events that can be received at all process entities that reside at the local cloud instance. The process-specific database lookup may be part of a single transaction which checks the event queues for all process instances that reside on the local cloud instance. Alternatively, each process instance may have its own polling transaction to achieve better decoupling between different processes and to configure individual polling intervals. Accordingly, the number of database transactions can be kept to a minimum. Although a polling method may be implemented by the cloud instance, if a signal event is received indicating an incoming event at the central database, the BPMS runtime of the cloud instance can immediately retrieve the event from the central database, which may reduce some delays caused by relying on polling alone.

Fetching newly arrived events from the message queues can be performed using regular polling requests where the time interval between database checks is configurable to particular process instances (if no interval is configured for a process instance, default values for the process type or all process types can be applied). In some implementations, the time interval between database checks can be automatically adjusted based on a frequency of previously received events, a business process type associated with the receiving business process instance, or on any other factor associated with the business process instance. The polling interval can be overridden when another cloud instance actively notifies the cloud instance where the process resides that an event has been included in one of the message queues associated with the cloud instance. Thus, increased latencies resulting from lengthy polling intervals can be avoided. In cases where the notification mechanism is omitted or the notification is lost, consistency is still maintained because the next polling interval will ultimately fetch the message from the message queue.

In the illustrated example, the BPMS runtime of the second cloud instance initiates polling of the central database at 810, triggering a lookup call to the central database at 820 to search for newly queued events. Here, the event submitted to the central database by the first cloud instance as described above in relation to FIG. 7 can be retrieved by the second cloud instance for consumption. In some instances, the retrieved event needs to become part of the process state, which can be achieved by materializing the event in a process state variable change. The event received at the second cloud instance, however, may require locking of the state variable associated with the receiving process instance. Accordingly, the locking mechanism is requested from the central locking service at 830 before the event is applied to the corresponding state variable at 840. The event is then fetched from the message queue and purged (or dequeued) from the message queue. After the transaction within which the process instance has fetched the event from the queue and applied it to the state variable has committed, the lock can be released at 850.

Here, the BPMS runtime can then optionally trigger successive process steps that react on the state variable change. Those steps will normally affect control flow and/or the data flow aspects of the process instance. Under certain circumstances, triggering those process steps may be deferred or depend on other conditions. In those cases, the materialized event (i.e., a process state variable) is still part of the process state but may actually only later be consumed by the process. In some of these cases, the process may never consume the event. In those cases, the BPMS runtime may be configured to either (1) remove the materialized event when the process has terminated or (2) free up the event for other process instances at that point. For instance, in a scenario where a stream of messages is consumed by process instances where each instance only handles a fixed number of messages, messages that exceed that number need to be picked up by a follow-up process instance. In other cases, the event may actually become irrelevant once the process has terminated. For instance, a process instance may be cancelled while an associated user task was still in progress. When that user task completes, the corresponding event does not need to be dispatched to another process instance but can be discarded.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method, comprising:
receiving a message at a first computer node executing a first process instance, the first computer node operating as one of a plurality of nodes in a networked environment, the message associated with a particular process instance executing in the networked environment;
identifying a second process instance associated with the message, wherein the second process instance associated with at least one particular node in the plurality of nodes in the networked environment, and wherein the identification of the second process instance comprises correlating a payload of the message with a data context of the second process instance; and
sending the message from the first computer node to a centralized messaging queue associated with the networked environment for storage and subsequent retrieval by the particular node associated with the second process instance if the second process instance is not locally executing at the first computer node, where the message is associated with the particular node associated with the second process instance in the centralized messaging queue, wherein the at least one particular node can access the centralized messaging queue to retrieve the message, wherein the particular node polls the centralized messaging queue for the message, and wherein a polling time is dynamically modified based on a calculation related to an average or median time in which new messages are received in the centralized messaging queue.

2. The method of claim 1, further comprising sending a notification message to a second computer node hosting the second process instance, the notification message indicating that the message can be retrieved from the centralized messaging queue.

3. The method of claim 1, wherein the centralized messaging queue is identified based on a process instance identifier of the second process instance.

4. The method of claim 1, wherein receiving the message at the first computer node comprises receiving the message from a load balancer distributing messages received at a network.

5. The method of claim 1, wherein identifying the second process instance associated with the message further comprises identifying a plurality of process instances associated with the message.

6. The method of claim 1, further comprising determining that the message indicates a change to a shared state variable.

7. The method of claim 6, further comprising obtaining a lock on the shared state variable if the message indicates the change to the shared state variable, wherein obtaining the lock on the shared state variable comprises preventing other components and process instances other than the second process instance from accessing the shared state variable.

8. A computer-accessible, non-transitory, storage medium encoded with computer-readable instructions configured to cause one or more data processing apparatus to:
receive a message at a first computer node executing a first process instance, the first computer node operating as one of a plurality of nodes in a networked environment, the message associated with a particular process instance executing in the networked environment;
identify a second process instance associated with the message, wherein the second process instance associated with at least one particular node in the plurality of nodes in the networked environment, and wherein the identification of the second process instance comprises correlating a payload of the message with a data context of the second process instance; and send the message from the first computer node to a centralized messaging queue associated with the networked environment for storage and subsequent retrieval by the particular node associated with the second process instance if the second process instance is not locally executing at the first computer node, where the message is associated with the particular node associated with the second process instance in the centralized messaging queue, wherein the at least one particular node can access the centralized messaging queue to retrieve the message, wherein the particular node polls the centralized messaging queue for the message, and wherein a polling time is dynamically modified based on a calculation related to an average or median time in which new messages are received in the centralized messaging queue.

9. The medium of claim 8, further configured to send a notification message to a second computer node hosting the second process instance, the notification message indicating that the message can be retrieved from the centralized messaging queue.

10. The medium of claim 8, wherein the centralized messaging queue is identified based on a process instance identifier of the second process instance.

11. The medium of claim 8, wherein receiving the message at the first computer node comprises receiving the message from a load balancer distributing messages received at a network.

12. The medium of claim 8, wherein identifying the second process instance associated with the message further comprises identifying a plurality of process instances associated with the message.

13. The medium of claim 8, further configured to determine that the message indicates a change to a shared state variable.

14. The medium of claim 13, further configured to obtain a lock on the shared state variable if the message indicates the change to the shared state variable, wherein obtaining the lock on the shared state variable comprises preventing other components and process instances other than the second process instance from accessing the shared state variable.

15. A computer-implemented system, comprising:
memory operable to store a computer node; and
at least one hardware processor interoperably coupled to the memory and operable to:
receive a message at a first computer node executing a first process instance, the first computer node operating as one of a plurality of nodes in a networked environment, the message associated with a particular process instance executing in the networked environment;

identify a second process instance associated with the message, wherein the second process instance associated with at least one particular node in the plurality of nodes in the networked environment, and wherein the identification of the second process instance comprises correlating a payload of the message with a data context of the second process instance; and send the message from the first computer node to a centralized messaging queue associated with the networked environment for storage and subsequent retrieval by the particular node associated with the second process instance if the second process instance is not locally executing at the first computer node, where the message is associated with the particular node associated with the second process instance in the centralized messaging queue, wherein the at least one particular node can access the centralized messaging queue to retrieve the message, wherein the particular node polls the centralized messaging queue for the message, and wherein a polling time is dynamically modified based on a calculation related to an average or median time in which new messages are received in the centralized messaging queue.

16. The system of claim 15 further operable to send a notification message to a second computer node hosting the second process instance, the notification message indicating that the message can be retrieved from the centralized messaging queue.

17. The system of claim 15, wherein the centralized messaging queue is identified based on a process instance identifier of the second process instance.

18. The system of claim 15, wherein receiving the message at the first computer node comprises receiving the message from a load balancer distributing messages received at a network.

19. The system of claim 15, wherein identifying the second process instance associated with the message further comprises identifying a plurality of process instances associated with the message.

20. The system of claim 15 further operable to:
determine that the message indicates a change to a shared state variable; and
obtain a lock on the shared state variable if the message indicates the change to the shared state variable, wherein obtaining the lock on the shared state variable comprises preventing other components and process instances other than the second process instance from accessing the shared state variable.

* * * * *